March 19, 1963 V. L. CORBIN ETAL 3,081,874
SCREEN TENSIONING DEVICE
Filed June 27, 1960 2 Sheets-Sheet 1

INVENTORS.
Vernon L. Corbin.
BY Allan M. Crain.
Wood, Herron & Evans.
ATTORNEYS.

March 19, 1963

V. L. CORBIN ETAL 3,081,874

SCREEN TENSIONING DEVICE

Filed June 27, 1960

INVENTORS.
Vernon L. Corbin.
BY Allan M. Crain.
Wood, Herron & Evans.
ATTORNEYS.

3,081,874
SCREEN TENSIONING DEVICE
Vernon L. Corbin and Allan M. Crain, Cincinnati, Ohio, assignors to The Orville Simpson Company, Cincinnati, Ohio, a corporation of Ohio
Filed June 27, 1960, Ser. No. 39,173
4 Claims. (Cl. 209—408)

This invention relates to devices for mounting and applying tension to screens of the type employed in power driven sifting and screening machines. More particularly, it relates to sifting screen tensioning devices such that a relatively constant tensional force is exerted along the margins of the screen to thereby maintain the screen at substantially uniform tautness over a range of operating conditions, and such that the screen is readily removable from the frame to which it is secured.

In sifting machines of the type to which this invention relates, the screen is secured to a frame to which is imparted a vibratory or gyratory motion effective to promote screening of particulate materials fed onto the surface of the screen. As the machine is operated, particles of size smaller than the mesh of the screen pass through the screen to a collector or hopper therebeneath. Oversize particles, or "tailings," remain on the screen, which is usually angulated with respect to horizontal, and gravitate toward its lower or discharge end, and there fall into a chute leading to a second hopper.

The screen of such a machine may be, for example, as much as five feet wide and ten feet long, or larger. Depending on the specific materials to be sifted, the screen may comprise for instance, a relatively large mesh wire screen or, where ultra-fine materials are to be sifted, a fine mesh silk bolting cloth. The screen is marginally secured to the frame so that it is relatively taut or stretched thereon and presents a generally planar screening surface.

A number of methods of securing screens to their frames are presently in use. Where the screen is of wire, it is usually fastened to a wooden frame simply by staple nails; where the screen comprises a fine mesh fabric, more elaborate arrangements are sometimes necessitated to fasten the screen to the frame.

Screen wear occurs as a normal incident to the operation of every screening machine, occasioned by the action of the particulate material on the surface of the screen, thereby rendering necessary its occasional replacement. The frequency of screen replacement depends on its own structure as well as on the nature of the material undergoing screening. In some cases, e.g. where highly abrasive materials are undergoing sifting, it may be necessary to replace a screen after as few as forty or fifty hours of operation. To facilitate its replacement, it is desirable that the screen be secured to the frame in such fashion as to be easily removable therefrom regardless of its expected useful life.

An important objective of the present invention is the provision of quick-acting means for securing a screen to a frame whereby the screen may readily be connected to or detached from the frame to facilitate the installation of a new screen of the same or a different type.

Another object of the present invention is the provision of simple and relatively inexpensive means of attaching any type of screen, without regard to the material of which it is made, to a frame so that a variety of different screens may be interchangeably mounted on the same screen frame.

To promote efficiency of material separation, and to promote long screen life, it is desirable that the screen be stretched or mounted relatively tautly on the frame. It is also desirable, for the same reasons, that the tension of the screen, that is, its relative tautness, be substantially constant during operation. It is empirically known that a relatively taut screen will separate particulate materials more efficiently than a screen which is loosely mounted to its frame. Moreover, a screen which is improperly tensioned will continuously flex or deform under the vibratory motion imparted to it during operation; as a result of this constant flexing, certain screens, particularly metal screens, fatigue or wear relatively rapidly, which considerably shortens their useful life.

Another important objective of this invention is the provision of screen mounting means whereby a screen is tautly but yieldably secured to the screen frame so that mechanical fatigue and screen wear are minimized and screening efficiency is maximized, and further whereby substantially constant tension is maintained on the screen over a range of screen loadings.

Still another objective is the provision of a special tool for use with the screen tensioning means of the invention for quickly engaging those means with cooperating means on a screen to secure that screen to a frame for operation therewith.

Briefly put, a preferred embodiment of the present invention comprises a screen frame provided with a peripheral, outwardly extending rail or flange at spaced intervals along which are arranged spring means presenting finger-like portions extending generally normal to the plane of the screen. The screen is provided along its margins with slots or openings for engaging the finger-like portions of the springs so as to be held in tension over the frame.

The invention may best be further described in relation to the accompanying drawings, in which.

Figure 3:
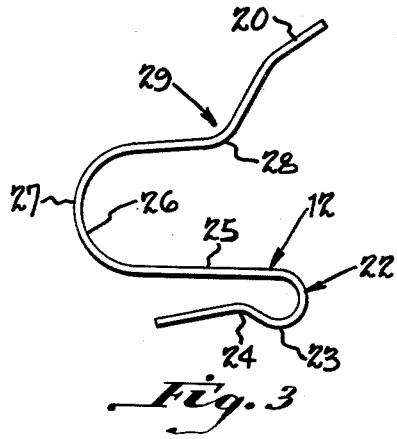
Figure 4:
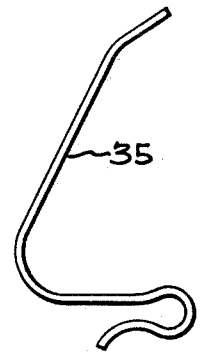
Figure 5:
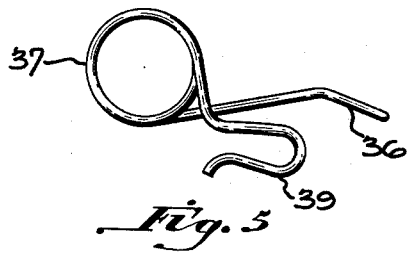
Figure 6:
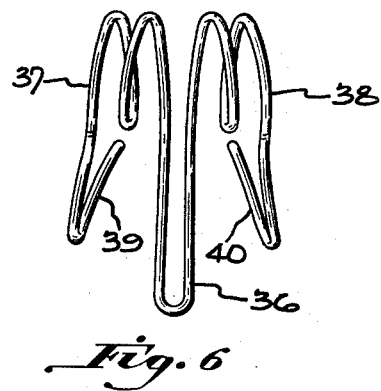
Figure 7:
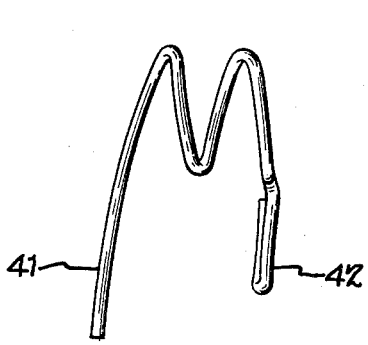
Figure 8:
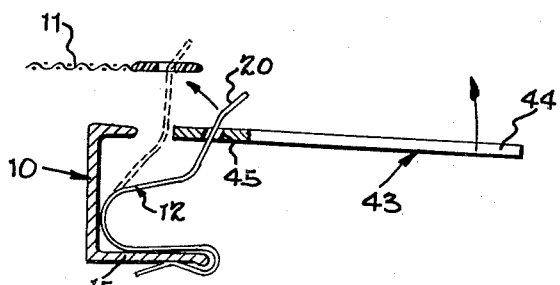

FIGURES 3–7 show various embodiments of screen tensioning springs in accordance with the invention; FIGURE 3 is a side view of a preferred leaf spring; FIGURE 4 is a side view of a different leaf spring tensioner; FIGURE 5 is a side view of coil spring tensioner; FIGURE 6 is a top view of a double coil tensioner of which a side view is shown in FIGURE 5; and FIGURE 7 is a top view of a single coil tensioner;

FIGURE 8 is a side view of a tool in accordance with the invention for engaging the spring with a screen, showing the manner in which the tool is fitted to the spring.

Figure 1:
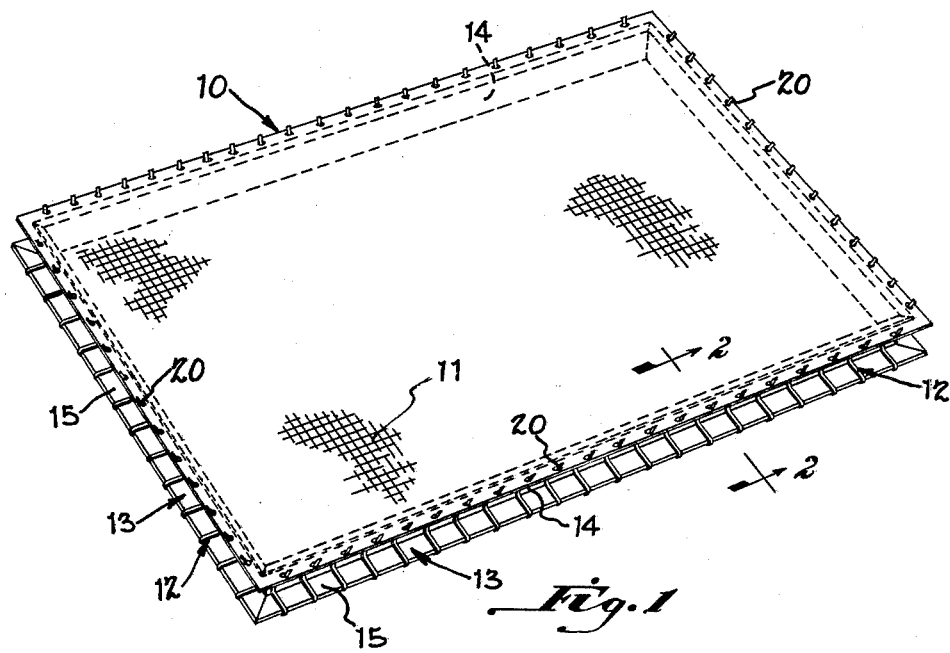
FIGURE 1 is a perspective view of a preferred embodiment of the invention in which a wire screen is mounted on a frame by leaf spring screen tensioners.

In FIGURE 1, a screen frame of generally rectangular outline is shown at 10. Between the opposite sides of frame 10 is stretched a screen 11, which, for purposes of illustration, is shown as a wire mesh screen. The screen is secured to the frame by means of tensioners 12 spaced around the frame.

As will be understood by those skilled in the art, the frame 10 is received in an enclosing housing or screen box, not shown, to which a vibratory sifting motion may be applied. As is conventional, materials to be sifted are deposited on the screen from a feed chute; as the screen oscillates during operation, fines pass through it while tailings are retained on its upper surface and are thereby separated from the fines.

In the embodiment shown in FIGURE 1, a single screen and frame are shown. In practice, it is common to mount or stack two or more screen frames in a single housing to effect multiple grading of materials. In such installations, the fines from the uppermost screen discharge onto the screen next below it, and are there further separated into two classes by size. Thus, while only a single screen and frame are shown, it will be understood that the invention is suited for use on multiple screen machines as well as on single screen machines.

The frame is fabricated from four elongated flanged members 13 which are mitered and joined at their corners. One of these members 13 is shown in section in FIGURE 2. It comprises a web portion 14, a flange 15 extending outwardly from web 14, and a rim 16 spaced above the flange, over which the screen 11 is facially disposed. The upper surface of rim 16 is preferably angulated slightly downwardly as at 17. A bead or rib 18 is provided along the lower edge of flange 15. The frame side sections 13 are preferably extruded in aluminum, but may, of course, be formed in any suitable manner from other materials.

Figure 2:
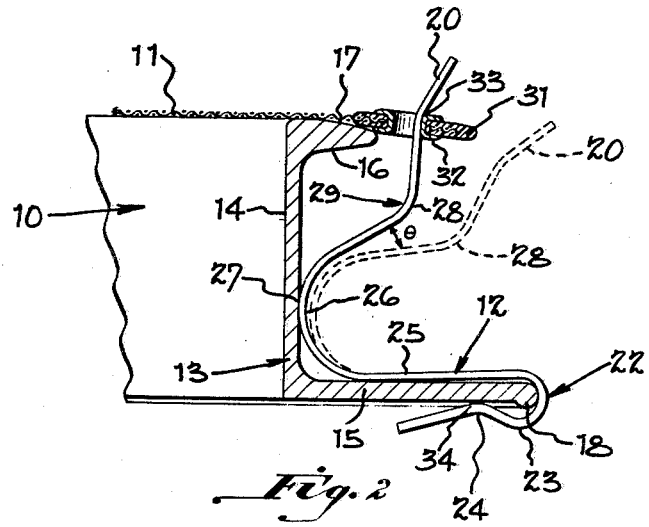
FIGURE 2 is an enlarged sectional view taken on line 2—2 of FIGURE 1.

Each screen tensioning spring 12 is hooked or engaged on the flange 15 outwardly of web 14, and presents a tensionably yieldable finger portion 20 which extends generally upwardly, i.e., normally to the plane of the screen. The spring 12 is secured to frame flange 15 through a hook or clip 22, the lower portion 23 of which includes a detent 24 which snaps over flange bead 18. The upper portion 25 of the hook 22 turns back on itself through radius 26, the extreme left point 27 of which may bear upon frame web 14, as shown in FIGURE 2. Beyond radius 26, the spring extends to point 28 where it turns upwardly, those portions on each side of bend 28 defining an elbow or crook 29. The spring terminates in the screen engaging finger 20. In FIGURE 2, the normal, or unloaded, configuration of the spring is indicated by the dashed lines; under tension, e.g. when connected to the screen, the spring assumes the shape shown by the solid lines in FIGURE 2. For clarity, the spring is shown in relaxed attitude in FIGURE 3.

A spring of the preferred type shown in FIGURES 2 and 3 exerts relatively constant pull over a range of angles $\theta$. In other words, the pull of the spring on the screen is relatively constant regardless (within limits) of its elastic distension, a result which we have found to be desirable from the standpoint of uniformity of screening and prolongation of screen life.

A preferred screen for use with the tensioners of this invention is shown in FIGURES 1 and 2. An annular region adjacent the edges of the screen is encased or coated with a semi-flexible plastic 31 through which grommets 32 extend at spaced intervals. The plastic edging 31, while not essential, considerably stiffens the screen and effects more uniform tensioning by distributing the stress over those portions of the screen periphery which lie between adjoining grommets. As a typical example, the edging may comprise molded polyvinyl plastic applied in conventional manner. A screen provided with edging of this type does not "loop" to an undesirable extent between tensioners spaced about five inches apart, and may be rolled up for convenient storage and shipment. The edging is of advantage when applied either to wire or textile screens.

The screen is attached to a frame equipped with tensioners of the present invention as follows: The tensioners are first individually snapped onto the frame flanges 15 at intervals approximating the spacing of the grommets 32 in the screen. Although lesser or greater spacings may be used if desired, a spacing of about five inches is suitable in most instances. While the detent 24 of the spring hook 22 holds the spring onto the flange, the detent should not so tightly engage the bead 18 as to prevent the spring from being shiftable in longitudinal direction along the flange, for such slidability permits tensioner spacing to be varied to suit the grommet spacing of different screens as well as to compensate for minor variations in the grommet spacing of any given screen. The fingers are engaged in the screen grommets by forcing the fingers inwardly toward the edge of flange 16 until the grommets can be dropped downwardly over them. A special tool for this purpose is shown in FIGURE 8, and is described in detail hereinafter.

The arrangement described greatly facilitates removal of the screen from the frame for replacement or change thereof: simply by grasping it at one corner and pulling it upwardly until the grommets are clear of the fingers, the screen can be removed from the frame. The tensioners remain engaged on flange 15 during screen removal, since detents 24 are snapped behind rib 18, positioned for installation of a new screen. Furthermore, the arrangement is one rendering the frame, tensioners, and screen all easily cleanable, a consideration which is increasingly important in view of local sanitation ordinances. With the tensioners removed from flange 15, the frame presents a smooth, easily cleanable surface, while the tensioners and screen may be handled as individual units for cleaning. In comparison with, for instance, a construction in which the screen is nailed to the frame, the advantages of such convenient disassembly will be manifest.

Referring again to FIGURE 3, the function of the "crook" 29 formed by bend 28 may be explained. The purpose of the crook is to make the tension of the spring more nearly uniform between its elastic limits. In general, the greater the length of a spring between the point at which it applies its force (point 33 in FIGURE 2) and the point at which the spring is fixed (point 34 in FIGURE 2), the more uniform the pull exerted by that spring. Thus, crook 29 simply increases the length of the spring between those two points. It will be appreciated that there are other equivalent ways of increasing the working portion of the spring.

In FIGURE 4 is shown a side view of a spring similar to that shown in FIGURE 3, but without a crook, having instead a straight shank portion 35. This spring provides relatively less uniform tension under stress, but is suitable where very constant force is not necessary.

In FIGURES 5-7 are shown views of coil torsion springs for mounting a screen to a frame of the type shown in FIGURES 1 and 2. A preferred double coil torsion spring is shown in side and top view in FIGURES 5 and 6 respectively, while a single coil torsion spring is shown in FIGURE 7, its side view being generally the same as that shown in FIGURE 5.

The preferred coil spring tensioner comprises a spring wire middled to form the screen engaging finger 36, dimensioned to engage the grommet or other means provided at the edge of the screen. On either side of finger 36 are spiral torsion coils 37 and 38, which are coiled relatively more as finger 36 is stressed counterclockwise in FIGURE 5.

Outside of the coils, the spring terminates in flange engaging hooks 39 and 40, shaped similarly to the hook 22 of the leaf spring of FIGURE 2. Since finger 36 is positioned midway between hooks 39 and 40, the double coil torsion spring exhibits no tendency to twist about a vertical axis under load conditions. The single coil torsion spring shown in FIGURE 7, which is equivalent to the right half of the double coil spring of FIGURE 6, does tend to twist about its single hook 42 since the load is applied to finger 41 to the left of the hook.

Springs embodying the principles of our invention are not limited to those specifically described. In general, it may be said that the invention contemplates any spring configuration which includes flange engaging means permitting longitudinal movement of the spring along the flange but restricting removal of the spring from the flange, and finger means for engaging the screen in a direction substantially perpendicular with respect to the plane of the screen.

Nor are the grommets and plastic edging shown the only connective means by which the screen can receive the spring fingers. The screen may be equipped with other marginally disposed means in which the fingers are engageable and whereby the screen may be disengaged by pulling it upwardly from the frame. For instance, it is contemplated that the screen may be provided with a peripheral wire or stiffener against the inner edge of which the fingers bear.

We have also invented a special tool, shown in FIGURE 8, for engaging the tensioners in the screen grommets or other connections. As has been explained previously, the finger portion 20 of the tensioner is forced inwardly toward the edge of flange edge 16 until the grommet can be pushed down onto the finger. The force which must be applied to the spring may be 40 pounds or more, depending on the size of the spring; use of this tool to apply leverage to bend the finger inwardly greatly simplifies the job.

The tool 43 comprises an elongated lever arm 44 in the side of which adjacent one end is provided a transverse slot 45 dimensioned to receive finger 20. As shown in the drawing, the finger of the tensioner is seated in notch 45 and an upward or counterclockwise torque is applied to lever arm 44, whereby the finger is forced inwardly to a position such that the grommet (or other) connection may be made.

Having described our invention, we claim:

1. In combination, a screen frame having an outwardly extending flange, said flange having a bead on its outer edge, a plurality of screen tensioners mounted around the periphery of said frame, each tensioner comprising a spring having a clip portion fitted onto said flange and a yieldable finger extending upwardly from the plane of said frame, said clip portion including a detent snapped inwardly of said bead, and a screen provided with grommets at spaced intervals along its periphery, the respective fingers of said tensioners extending through said grommets, said screen being stretched between tensioners disposed on opposite sides of said frame.

2. In combination, a screen frame having an outwardly extending flange, said flange having a bead along its edge, a plurality of screen tensioners mounted at spaced intervals around the periphery of said frame, each tensioner comprising a spring having a clip portion fitted onto said flange and a tensionally yieldable finger extending substantially normally to the plane of said frame, said clip portion including a detent snapped inwardly of said bead, and a screen, said screen having peripheral stiffening means, grommets extending through said stiffening means, the respective fingers of said tensioners extending substantially normally through said grommets, said screen being stretched between tensioners disposed on opposite sides of said frame.

3. In combination, a screen frame having an outwardly extending flange, said flange having a bead on its outer edge, a plurality of screen tensioners mounted around the periphery of said frame, each tensioner comprising a spring having a clip portion fitted onto said flange and a yieldable finger extending upwardly from the plane of said frame, said clip portion including a detent snapped inwardly of said bead, and a screen provided with openings at spaced intervals along its periphery, the respective fingers of said tensioners extending through said openings, said screen being stretched between tensioners disposed on opposite sides of said frame.

4. In combination, a screen frame having an outwardly extending flange, said flange having a bead along its edge, a plurality of screen tensioners located at spaced intervals around the periphery of said frame, each tensioner comprising a leaf spring having a U-shaped clip portion fitted onto said flange and a tensionally yieldable finger extending substantially normally to the plane of said frame, said clip portion including a detent snapped inwardly of said bead, and a screen, said screen having peripheral stiffening means provided with openings extending therethrough, the respective fingers of said tensioners extending substantially normally through said openings, said screen being stretched between tensioners disposed on opposite sides of said frame.

References Cited in the file of this patent

UNITED STATES PATENTS

| | | |
|---|---|---|
| 1,479,834 | Reynolds | Jan. 8, 1924 |
| 1,684,526 | Tucker | Sept. 18, 1928 |
| 1,824,616 | Neher | Sept. 22, 1931 |
| 2,015,087 | Rafton | Sept. 24, 1935 |
| 2,335,084 | Rice | Nov. 23, 1943 |
| 2,345,947 | Parks | Apr. 4, 1944 |
| 2,770,812 | Whiteside | Nov. 20, 1956 |
| 2,910,180 | Parks | Oct. 27, 1959 |

FOREIGN PATENTS

| | | |
|---|---|---|
| 2,988 | Great Britain | July 24, 1876 |
| 7,234 | Great Britain | Mar. 23, 1914 |
| 552,632 | Great Britain | Apr. 16, 1943 |